(12) United States Patent
Mitsunaga et al.

(10) Patent No.: US 6,252,985 B1
(45) Date of Patent: Jun. 26, 2001

(54) IMAGE DETECTING APPARATUS

(75) Inventors: Tomoo Mitsunaga, Kanagawa; Takashi Totsuka, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/209,302

(22) Filed: Dec. 11, 1998

Related U.S. Application Data (63) Continuation of application No. 08/561,377, filed on Nov. 21, 1995, now Pat. No. 5,887,082.

(30) Foreign Application Priority Data

Nov. 29, 1994 (JP) .................................................. 6-321534

(51) Int. Cl.[7] .................................................. G06K 9/48
(52) U.S. Cl. ........................... 382/199; 382/164; 382/283
(58) Field of Search .................................. 382/144, 162, 382/171, 172, 173, 199, 164, 269, 270, 282, 283; 358/515–518, 548; 345/431

(56) References Cited

U.S. PATENT DOCUMENTS

| | | | |
|---|---|---|---|
| 4,814,755 | 3/1989 | Johnson | 340/709 |
| 4,868,884 | 9/1989 | Miyazaki | 382/209 |
| 5,253,339 | 10/1993 | Wells et al. | 395/126 |
| 5,386,234 | 1/1995 | Veltman et al. | 348/409 |
| 5,440,652 | 8/1995 | Ting | 382/165 |
| 5,461,420 | 10/1995 | Yonemitsu et al. | 348/401 |
| 5,481,553 | 1/1996 | Suzuki et al. | 371/49.1 |
| 5,515,388 | 5/1996 | Yagasaki | 371/49.1 |
| 5,574,800 | 11/1996 | Inoue et al. | 382/149 |
| 5,596,655 | 1/1997 | Lopwz | 382/173 |
| 5,604,822 | 2/1997 | Pearson et al. | 382/199 |
| 5,617,487 | 4/1997 | Yoneyama et al. | 382/199 |
| 5,630,037 | 5/1997 | Schindler | 395/131 |
| 5,687,251 | 11/1997 | Erler et al. | 382/199 |
| 5,892,853 | 4/1999 | Hirani et al. | 382/280 |

OTHER PUBLICATIONS

Benson, Television Engineering Handbook, McGraw Hill, New York, Published Dec. 1985, pp. 2.7 & 2.8.

Beyerer, J. "Suppression of Stochastically Placed, Straight Toolmarks To Enhance Objects and Defects", Techniques Messen TM 1982–1988, vol. 59, No. 10, Oct. 1, 1992, pp. 389–397.

Ferreira, P., et al., "Errorless Restoration Algorithms For Band–Limited Images", IEEE Nov. 1994, pp. 157–161.

Fienup, J.R., "Phase Retrieval; Algorithms: A Comparison", Applied Optics, vol. 21, No. 15, pp. 2758–2769, Aug. 1, 1982.

Gerchberg, R.W., "Super–Resolution Through Error Energy Reduction", Optica Acta, 1974, vol. 21, No. 9, 709–720, (Received Sep. 13, 1973, Revision Received Jan. 15, 1974).

Inoue, S., "An Object Extraction Method For Image Synthesis", Proceedings of the SPIE, The International Society for Optical Engineering, Conference Date Nov. 1991, vol. J74–D–11, No. 10, pp. 1411–1418.

(List continued on next page.)

*Primary Examiner*—Jay Patel
(74) *Attorney, Agent, or Firm*—Bell, Boyd & Lloyd LLC (57) ABSTRACT

An image area extracting method for extracting the desired areas from the image accurately and efficiently. The rough boundary area, in which the boundary area is roughly assigned between the desired area and areas other than the desired area, is divided into a plurality of small areas. The area extracting procedure is executed on each small area and the desired area and areas other than the desired area are detected from each small area. The boundary area mask image is formed based on the detection result and the desired area is extracted based on the boundary area mask image. Thus, the desired area can be extracted from the image accurately and efficiently.

8 Claims, 13 Drawing Sheets-

OTHER PUBLICATIONS

Jain, A., "Extrapolation Algorithms For Discrete Signals With Application In Spectral Estimation", IEEE Transactions On Acoustics, Speech, And Signal Processing, vol. ASSP–29, No. 4, pp. 830–845, Aug. 1981.

Pang, J., et al., "Signal Recovery From Subband Energy Constraints", Optical Society Of America, vol. 9, No. 7, pp. 1041–1051, Julk. 1992.

Papoulis, A., "A New Algorithm In Spectral Analysis And Band–Limited Extrapolation", IEEE Transactions On Circuits And Systems, vol. CAS–22, No. 9, pp. 735–742, Sep. 1975.

Peng, H., et al., "Signal Recovery with Similarity Constraints", Optical Society of America, vol. 6, No. 6, pp. 844–851, Jun. 1989.

Popat, K., et al., "Novel Cluster–Based Probability Model for Texture Synthesis, Classification, and Compression," Massachusetts Institute of Technology, Media Laboratory, SPIE vol. 2094, pp. 756–768, Nov. 1993.

Schafer R., et al., "Constrained Iterative Restoration Algorithms", Proceedings Of The IEEE, vol. 69, No. 4, pp. 432–450, Apr. 1981.

Sezan, M., et al., "Image Restoration By The Method Of Convex Projections: Part 2–Applications and Numerical Results", IEEE Transactions On Medical Imaging, vol. MI–1, No. 2k, pp. 95–101, Oct. 1982.

Sezan, M., et al., "Prototype Image Constraints For Set–Theoretic Image Restoration", IEEE Transactions On Signal Processing, vol. 39, No. 10, pp. 2275–2285, Oct. 1991.

Youla,. D. C., et al., "Image Restoration By the Method of Convex Projections: Part 1–Theory, IEEE Transactions on Medical Imaging", vol. MI–1, No. 2, pp. 81–94, Oct. 1982.

U.S. application No. 08/899,349, filed Jul. 23, 1997.

U.S. application No. 08/733,953, filed Oct. 21, 1996.

IMAGE DETECTING APPARATUS

This application is a continuation of Ser. No. 08/561,377 filed Nov. 21, 1995, now U.S. Pat. No. 5,887,082.

BACKGROUND OF THE INVENTION

1. Field of the Invention

The present invention relates to an image area extracting method and is suitably applied, for example, to the case of forming a key signal (a mask image) which is necessary at the time of an image synthesizing process among the works related to video production.

2. Description of the Related Art

Techniques to extract an object from an image are conventionally well-known as methods for special effects. The techniques to extract an object are the mask image hand painting (video mat) method, the method using chroma key processing and luminance key processing, and the rough contour assigning and thinning (Object Extracting Method for Image Mixing, by Seiki Inoue, The transactions of the Institute of Electronics, Information, and Communication Engineers D-II vol.j74-D-II pages 1411–1418, 1991).

The mask image hand painting method, in which an operator assigns an object area by hand painting in utilizing a painting tool such as a tablet, is a method capable of inputting the boundary of an object precisely.

On the other hand, the chroma key processing or the luminance key processing is the method to divide the area with a specified color or specified luminance by performing threshold processing on color information or luminance information of the input image. In this method, only assigning of the specified color or the specified luminance by the operator makes it possible to execute a uniform processing automatically to all picture elements.

Moreover, in the method of rough contour assigning and thining, the rough area including the contour of the object is assigned by an operator to obtain the shape of object by thining the rough area based on the intensity of edge so as to match this rough area to the contour of object automatically.

However, in the chroma key processing and the luminance key processing, an input image of which its characteristics greatly differ according to the position in one screen is processed in accordance with single threshold value to the pixel value of the entire image, the chroma key processing and the luminance key processing cannot be applied to the image with the arbitrary background. Therefore, they can be applied only to the specified input image taken with the uniform background for the purpose of synthesizing.

The rough contour assigning and thinning method is the method to assign the rough area and which is capable of extracting the object area from the uneven background. However, since this method is the processing only dependent upon the edge intensity, the correct result cannot be obtained in the area with an intense edge which is not the contour of the object, and there are cases where the accuracy is worse as compared with the video mat method. Also, in the case where the characteristics of background differs according to the position on the image, since single area extracting method is used, it is impossible to cope with the arbitrary background thoroughly.

Accordingly in these methods, it was only video mat method which was capable of extracting the object area accurately from the optional background. However, because the video mat method requires the process to assign the object area per one pixel, it requires much time and skill and there arises a problem that its operational efficiency is not favorable.

OBJECTS AND SUMMARY OF THE INVENTION

In view of the foregoing, an object of this invention is to provide an image area extracting method capable of extracting the desired area from the image accurately and efficiently.

The foregoing object and other objects of the present invention have been achieved by the provision of an image area extracting method for extracting the desired area from the image, comprising the steps of: dividing the rough boundary area corresponding to the image into a plurality of small areas, in which the boundary area between the desired area and the area other than the desired area is roughly assigned; executing the area extracting procedure to each small area to detect the desired area and areas other than the desired area from each small area; and forming the boundary area mask image based on the detection result and extracting the desired area based on the boundary area mask image.

The rough boundary area image in which the boundary area between the desired area and areas other than the desired area is roughly assigned is divided into a plurality of small areas, then the area extracting procedure is executed to each small area to detect the desired area and the areas other than the desired area from each small area, then the boundary area mask image is formed based on the result of above detection, and the desired area is extracted based on the boundary area mask image. Thus, the desired area can be extracted accurately and efficiently from the image.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of the present invention will be described with reference to the accompanying drawings:

(1) General Construction

Figure 1:
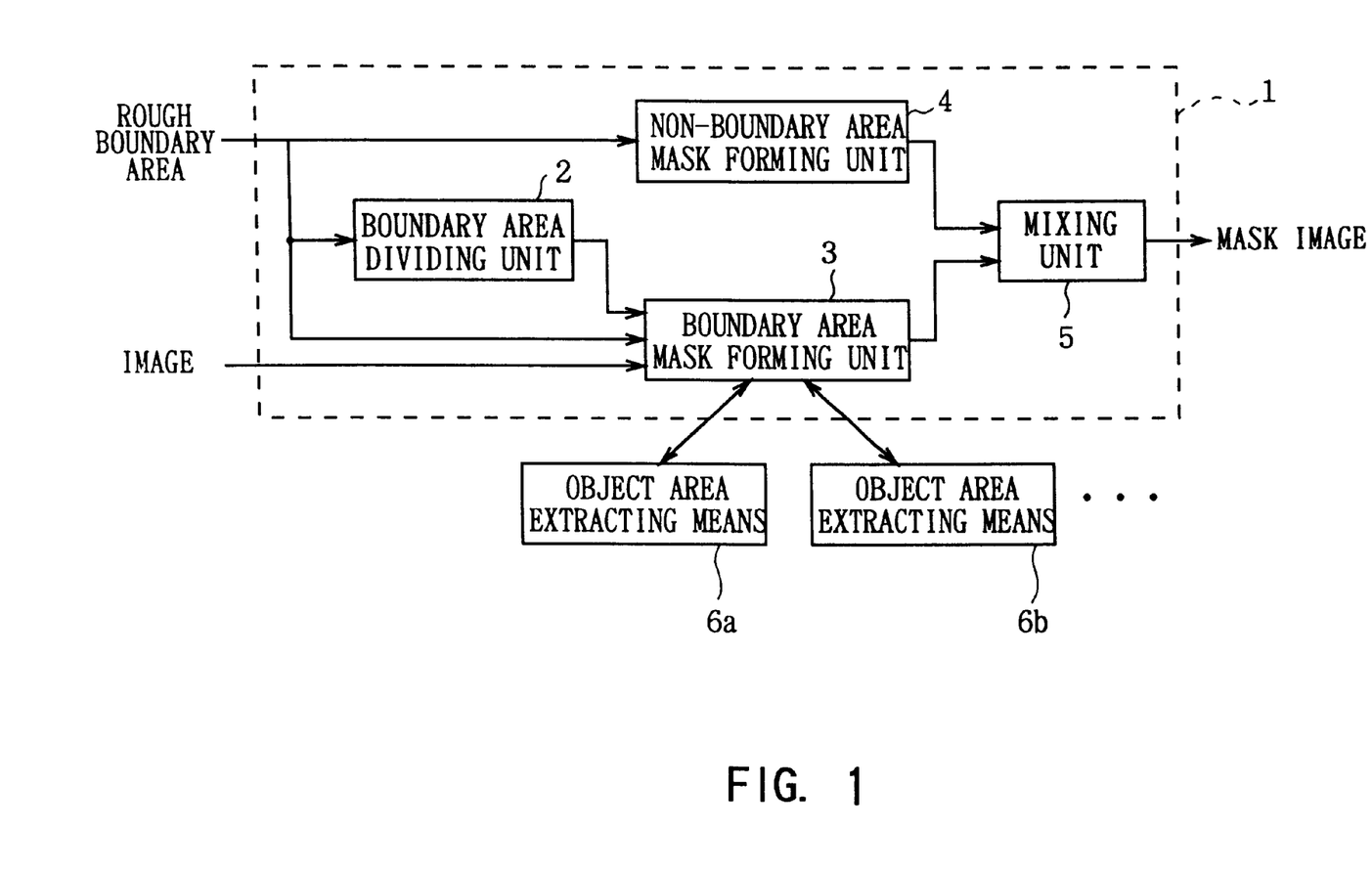
FIG. 1 is a block diagram showing a general construction of an object area extracting apparatus.

In FIG. 1, 1 generally shows an object area extracting apparatus according to the embodiment of the present invention. As shown in FIG. 1, the object area extracting apparatus 1 consists of a boundary area dividing unit 2, a boundary area mask forming unit 3, a non-boundary area mask forming unit 4 and a synthesizing unit 5. The boundary area mask forming unit 3 is connected to the plural number of object area extracting means 6a, 6b . . . . Each of the object area extracting means respectively have input means, which are not shown.

As shown in FIG. 1, the image including the object desired to be extracted and the rough boundary area image in which the boundary area between the object and the background is roughly assigned are input to the object area extracting apparatus 1. Here, the rough boundary area image is binary mask image. The boundary area dividing unit 2 divides the input rough boundary area image into small areas and outputs the position information of these small areas to the boundary area mask forming unit 3.

The boundary area mask forming unit 3 executes the object extracting process to each small area by using a proper means out of the object area extracting means 6a, 6b, . . . so as to form the mask of the entire boundary area and output to the synthesizing unit 5. At this point, the selection of the object area extracting means 6a, 6b, . . . depends on the outside input by, for example, the operator.

The non-boundary area mask forming unit 4 forms masks of areas other than the input rough boundary area, and outputs the masks of areas other than the formed rough boundary masks to the synthesizing unit 5. The synthesizing unit 5 synthesizes two masks formed at the boundary area mask forming unit 3 and at the non-boundary area mask forming unit 4 to form the binary mask image for assigning the object area.

(2) Object Area Extracting Process according to the Embodiment

Figure 2:
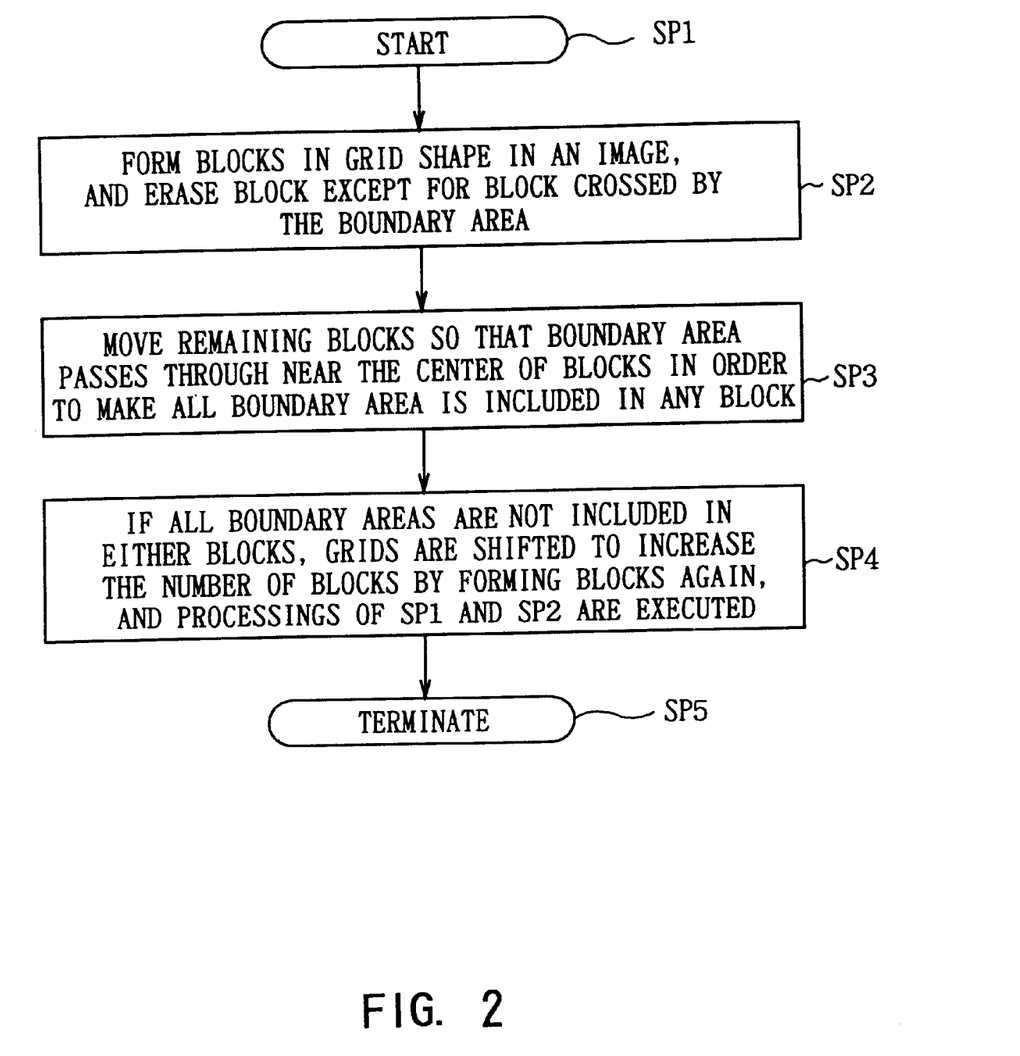
FIG. 2 is a flow chart showing the processing procedure of boundary area dividing.

In the object area extracting processing apparatus 1, at first the input rough boundary area image is divided into small areas at the boundary area dividing unit 2. In this embodiment, regular shape blocks larger than the width of the boundary area are used as the shape to divide boundary area. At this point, the block forming procedure at the boundary area dividing unit 2 is shown in FIG. 2, and concrete example of the image is shown in FIG. 3.

Figure 3:
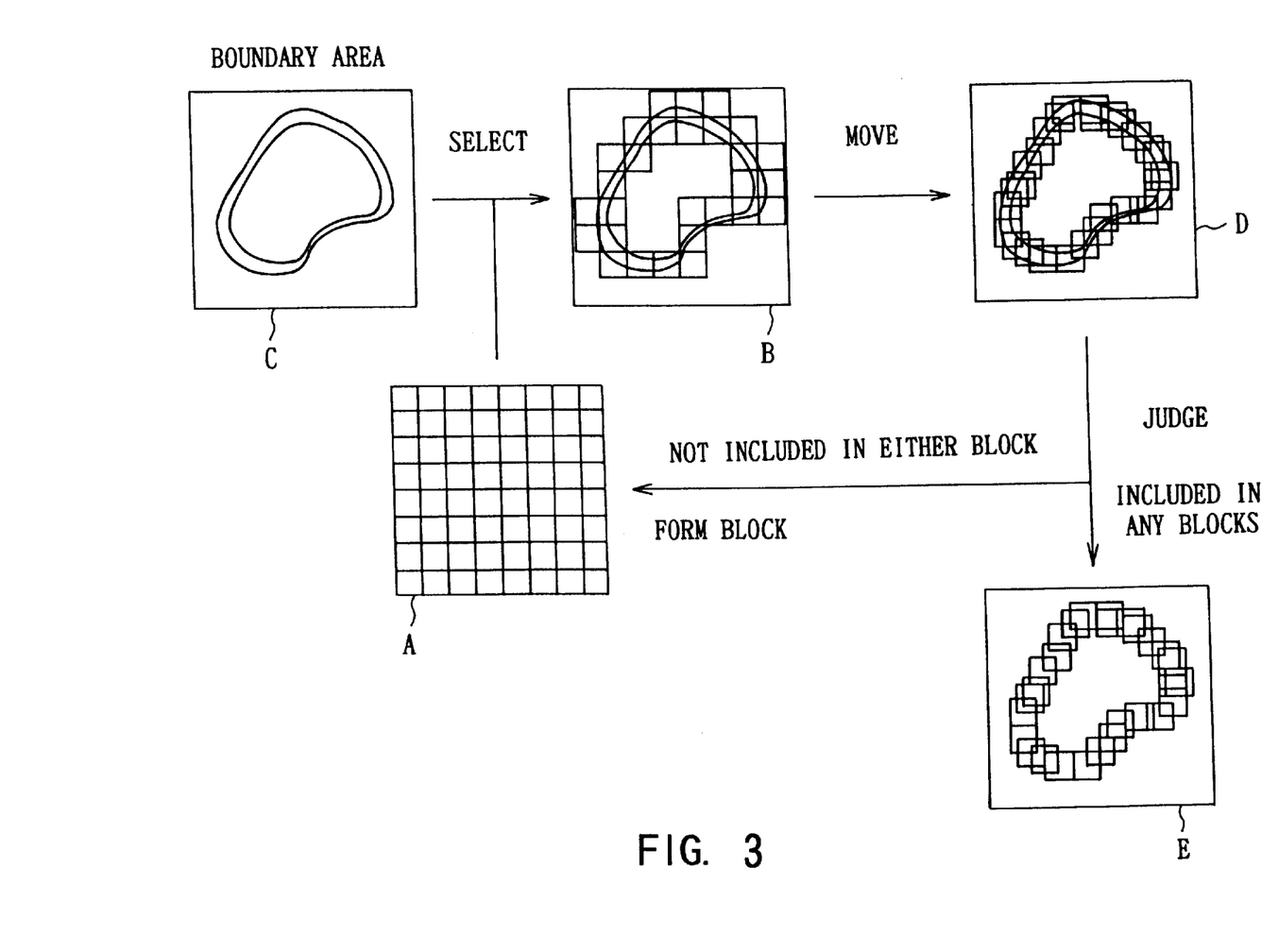
FIG. 3 is a block diagram showing the processing flow at the boundary area dividing unit.

Starting from step SP1, at step SP2, the boundary area dividing unit 2 forms blocks in grid shape as shown in A of FIG. 3, and then erases the blocks except the blocks crossed by the curve shown in C of FIG. 3 which is the boundary area as shown in B of FIG. 3.

Then, at step SP3, the boundary area dividing unit 2 moves each block of the remaining blocks so that the boundary area passes through near the center of blocks as shown in D of FIG. 3, and all boundary areas are thus included in any block (E of FIG. 3). At this point, if the condition in which all boundary areas are included in either block would not be satisfied, the boundary area dividing unit 2 shifts grids to increase the number of blocks by forming more blocks, and then executes the processing of step SP1 and step SP2 again.

When the entire boundary areas are included in any block, the boundary area dividing unit 2 terminates the processing at step SP5 and the position information of each block is output to the boundary area mask forming unit 3.

Figure 4:
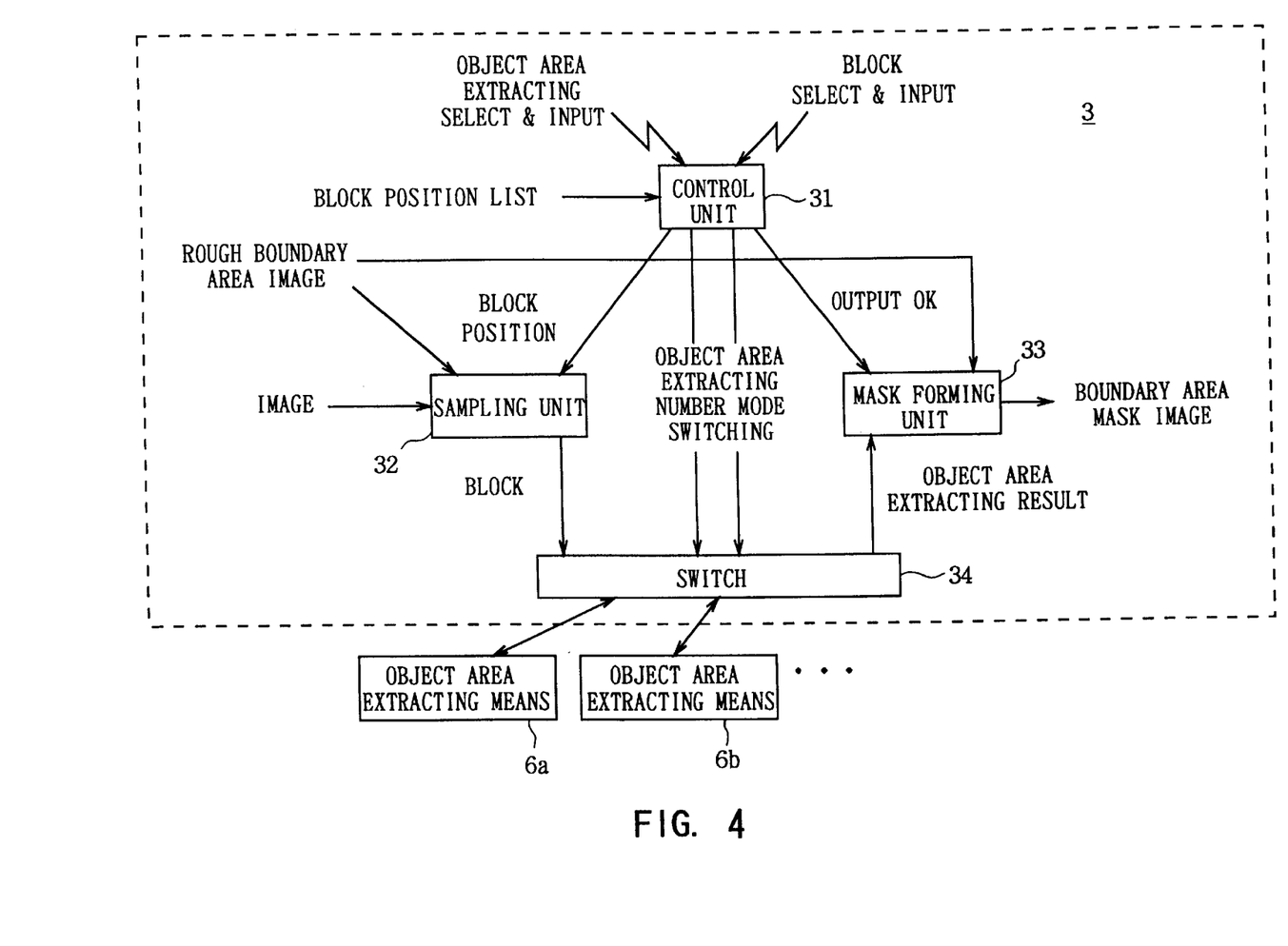
FIG. 4 is a block diagram showing the processing flow at the boundary area mask forming unit.

As shown in FIG. 4, the boundary area mask forming unit 3 consists of a control unit 31, a sampling unit 32, a mask forming unit 33 and a switch 34.

Figure 5:
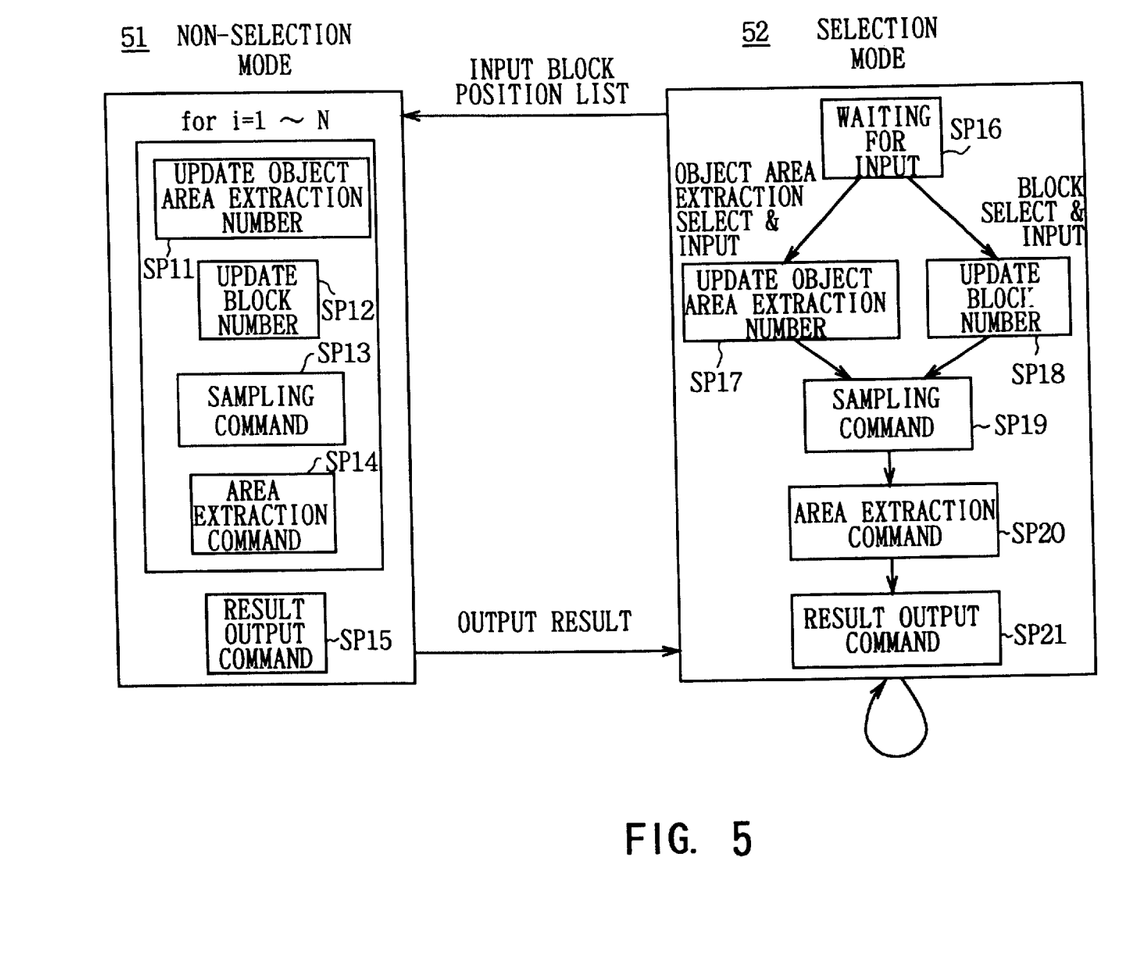
FIG. 5 is a block diagram showing the processing flow at the control unit of the boundary area mask forming unit.

The control unit 31 controls the whole of the boundary area mask forming unit 3, and the processing procedure of the control unit 31 is shown in FIG. 5. The control unit 31 has two kinds of conditions, i.e., non-selection mode and selection mode. The non-selection mode is the mode which is selected when the image data input is updated in order to output the first result. The selection mode is the mode which executes the processing by the object area extracting means 6a, 6b, . . . to the optional block interactively. The control unit 31 executes the object area extracting processing in the selection mode to the blocks which need modification, depending upon the first result for the new image input in non-selection mode.

Under the non-selection mode, the following processings are executed on all blocks of the input block position list.

As shown in the non-selection mode 51 of FIG. 5, the control unit 31 firstly selects one of the object area extracting means 6a, 6b, . . . (update the object area extracting number at step SP11). In the non-selection mode, preset default object area extracting means is selected. Then, the block to be informed to the sampling unit 32 is updated (update the block number at step SP12). In the non-selection mode, all blocks are selected in order.

Then, the control unit 31 designates the block position to the sampling unit 32 and outputs the sampling command to sample the necessary areas from the image data and rough boundary area image (SP13). The sampling unit 32 extracts the block position area informed by the control unit 31 from the image data and the input rough boundary area image so as to form each block. Formed two blocks are sent out to one of the object area extracting means 6a, 6b, . . . through the switch 34 in order to be used in the object area extracting process (SP15).

On the other hand, in the selection mode, the control unit 31 waits for whether selection and input of the object area extracting means or selection and input of the blocks (SP16), and then executes either to update the object area extracting number (SP17) or to update the block number (SP18) according to either of the inputs. After that, the control unit 31 outputs the sampling command to sample the necessary area (SP19).

Next, the control unit 31 informs the switch 34 of the selected object area extracting means 6a, 6b, . . . and the present mode to make the switch 34 execute the object area extracting process. More specifically, the switch 34 which is an interface to each object area extracting means 6a, 6b, . . . outputs two blocks as operation mode (non-selection mode or selection mode) and input data to the selected object area extracting means 6a, 6b, . . . Also the switch 34 receives the object area extraction result from the object area extracting means 6a, 6b, . . . and outputs the result and the block position information to the mask forming unit 33.

When terminating the above processing on all blocks, the control unit 31 sends a permission to output the boundary area mask image to the mask forming unit 33. More specifically, the mask forming unit 33 arranges obtained result of the object area extraction of each block on the image so as to form boundary area mask image. Upon receiving the output permission from the control unit 31, the mask forming unit 33 outputs the formed boundary area mask image. Moreover, the mask forming unit 33, when forming the boundary area mask image, copies only pixels to be assigned by the rough boundary area image among the object area extraction result of each block.

Figure 6A:
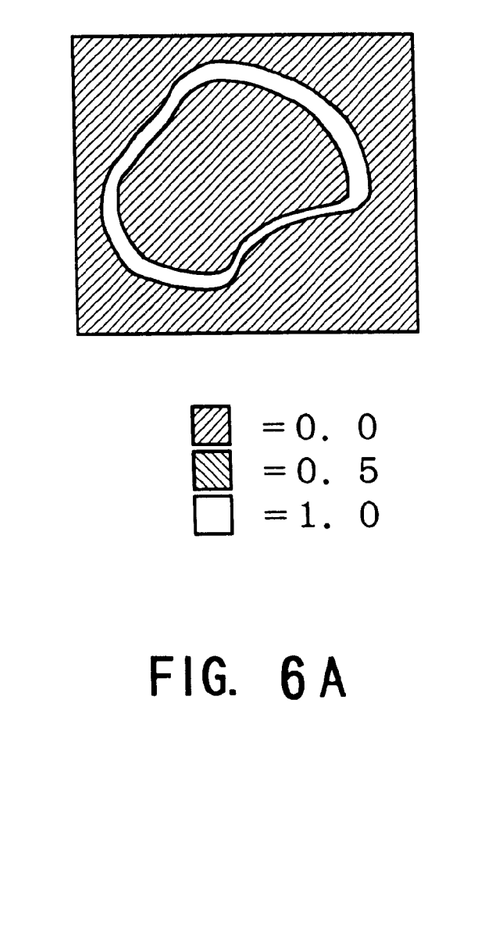
FIGS. 6A–B is a block diagram showing the processing flow at the non-boundary area mask forming unit.
Figure 6B:
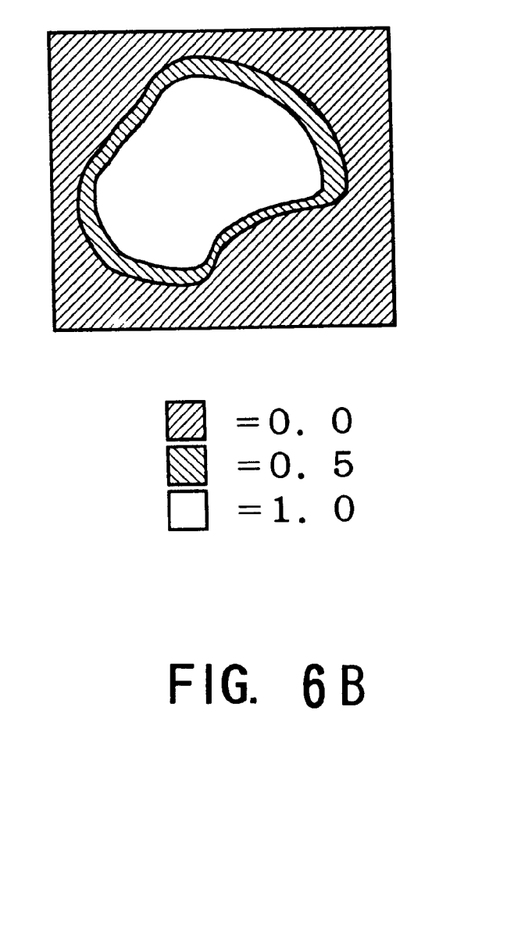

FIGS. 6A and 6B are the figures for describing the determination in the inside area of boundary area. In the non-boundary area mask forming unit 4, the mask image of which the outside of boundary area is $\alpha$–0, the inside of boundary area is $\alpha$=1, and the boundary area is indefinite (for convenience, $\alpha$=0.5) is formed.

At this point, the following mask images are obtained; the boundary area mask image of only the outside of boundary area ($\alpha$=0) as shown in FIG. 6A and two non-boundary area mask images having the area of which the boundary area is indefinite ($\alpha$=0.5).

Figure 7:
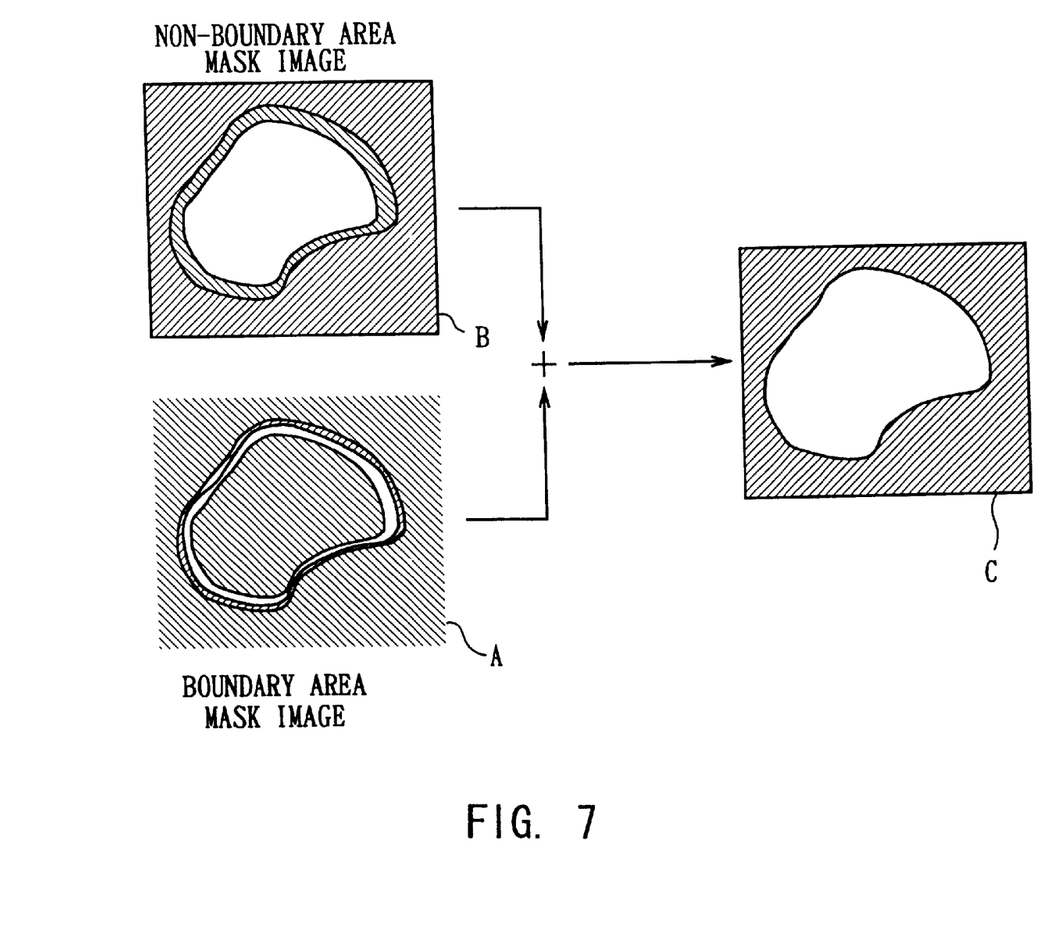
FIG. 7 is a block diagram showing the processing flow at synthesizing unit.

FIG. 7 is the figure for describing the replacement operation for the pixel value of the mask image.

The boundary area mask image formed at the boundary area mask forming unit 3 as shown in FIG. 6A and the non-boundary area mask image formed at the non-boundary area mask forming unit 4 as shown in FIG. 6B are synthesized at the synthesizing unit 5 and is output as the mask image C as shown in FIG. 7. More specifically, the synthesizing unit 5 operates to replace the pixel having 0.5 pixel value from the non-boundary area mask image B to the pixel value of the boundary area mask image.

(3) Object Area Extracting Means according to the Embodiment

In the object area extracting apparatus 1, multiple object area extracting means are prepared. In this embodiment, as the object area extracting means, the case using the ellipsoid color space dividing method and the axis selection edge detecting method will be described. In this embodiment, the axis selection edge detecting method will be selected in the non-selection mode.

Firstly, the ellipsoid color space dividing method is a method which approximates the color distribution obtained by distributing the color information of pixel data per the fixed unit in an image on RGB color space and divides color space using the ellipsoid surface and distinguishes each pixel.

Figure 8:
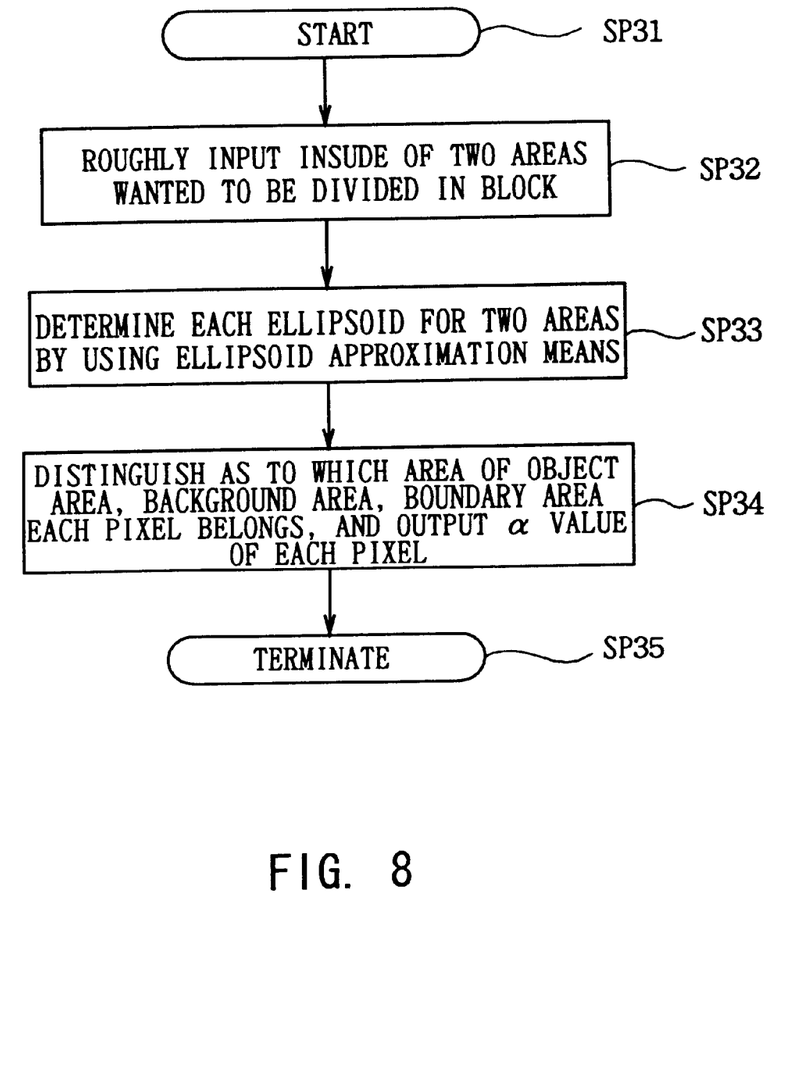
FIG. 8 is a flow chart showing the processing procedure in the case of applying an ellipsoid color space dividing method to the embodiment as object area extracting means.
Figure 9A:
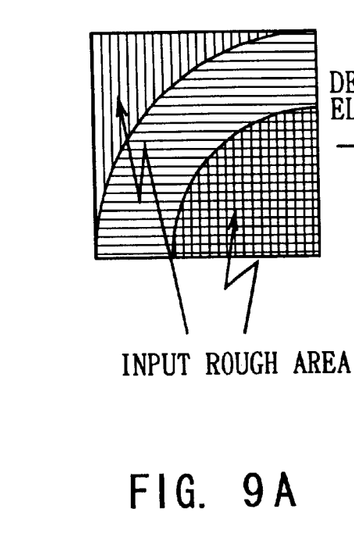
FIGS. 9A–C is a schematic diagram showing the processing flow in the case of applying the ellipsoid color space dividing method to the embodiment as object area extracting means.
Figure 9B:
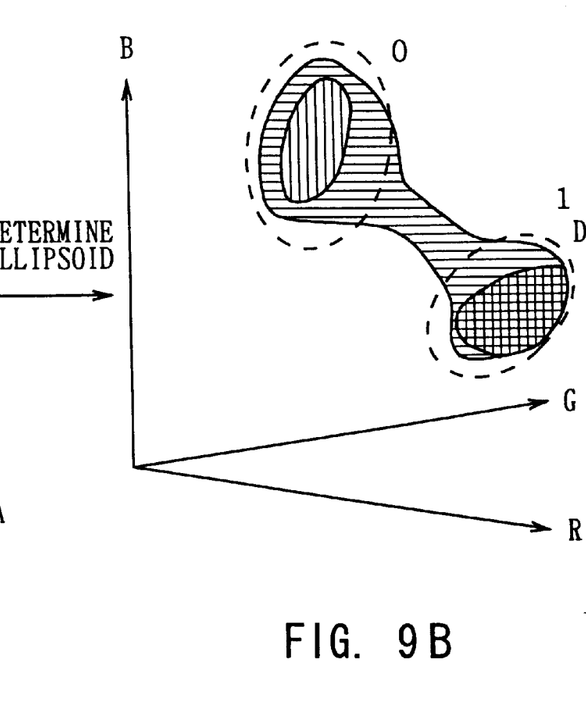
Figure 9C:
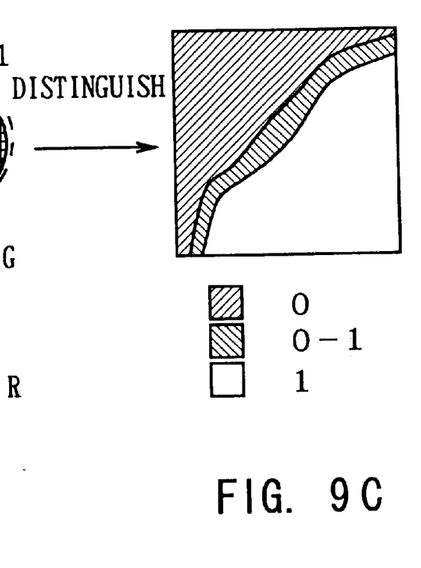

The processing procedure in which the ellipsoid color space dividing method is applied to the embodiment as the object area extracting means is shown in FIG. 8, and the type figure for facilitating to understand the processing is shown in FIGS. 9A to 9C.

In this embodiment, the pixel value in a block is given. At first, starting from step SP31, then at step SP32 two areas in a block wanted to be divided are roughly input as shown in FIG. 9A. In FIG. 9A, two areas are shown by vertical stripes and cross stripes, respectively.

Then, at step SP33, by using the ellipsoid approximation means described above, ellipsoids for respective two areas are decided as shown in FIG. 9B. Thus, color space is divided into the object area ($\alpha$=1), the background area ($\alpha$=0) and the boundary area (0<$\alpha$<1).

Thereafter, proceeding to step SP34, as shown in FIG. 9C, each pixel is distinguished as to which area of the object area, the background area, and the boundary area it belongs to, and a value of each pixel is output as a result of extraction, and the processing is terminated at step SP35. If the pixel belongs to the boundary area, $\alpha$ value is calculated according to the position relation to two ellipsoids.

The axis selection edge detecting method is the method to detect edges of the object area by selecting the edge detection axis direction on the image or color space.

Figure 10:
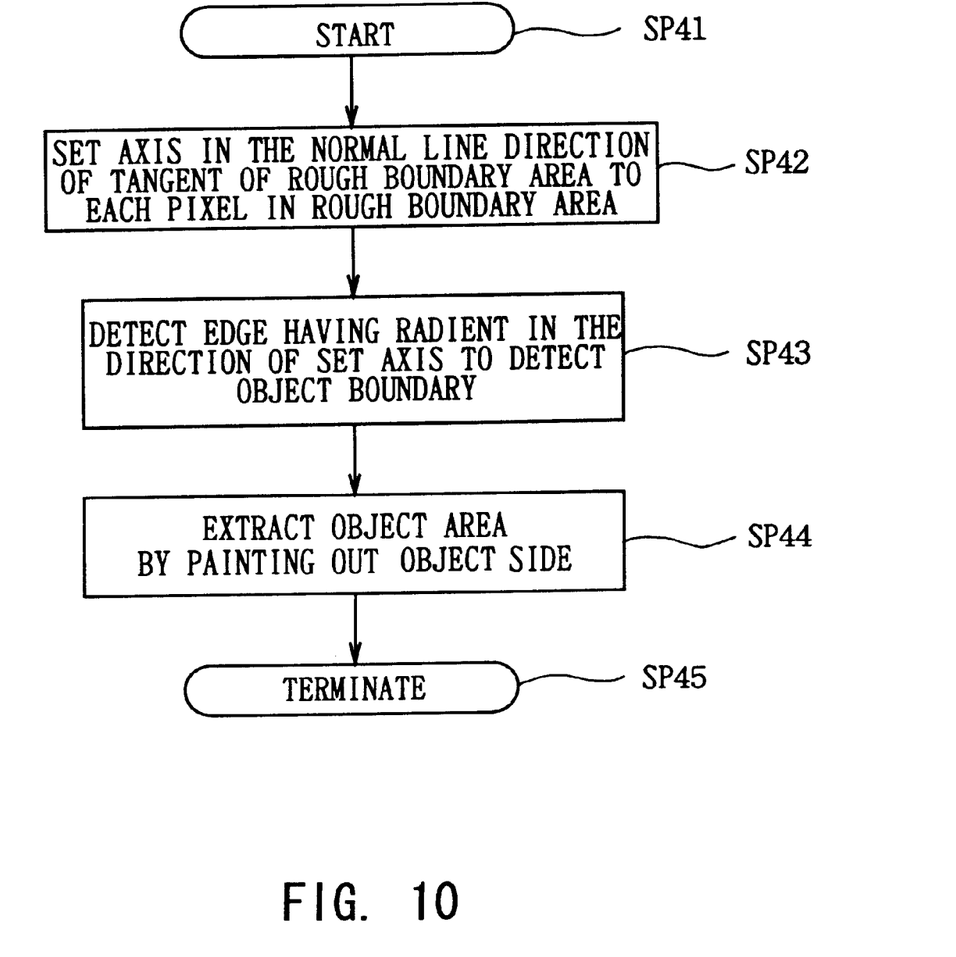
FIG. 10 is a flow chart showing the processing procedure in the case of applying axis selection on the image to the embodiment as object area extracting means.
Figure 11A:
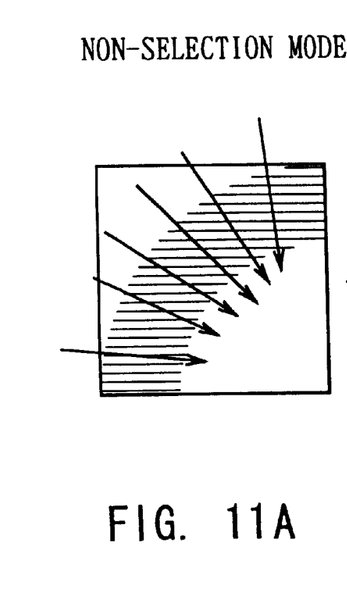
FIGS. 11A–C is a schematic diagram showing the processing flow in the case of using the axis selection on the image.
Figure 11B:
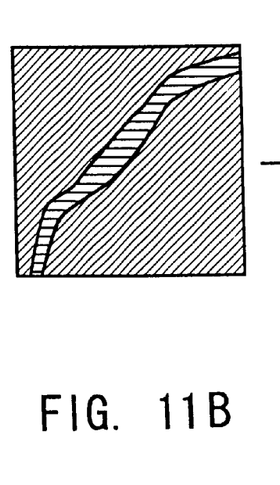
Figure 11C:
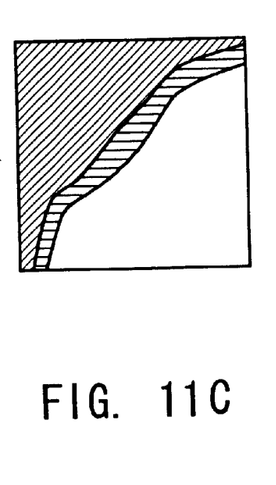

The processing procedure in which the axis selection edge detecting method is used as an object area extracting means is shown in FIG. 10, and the type figures for facilitating to understand the processing procedure are shown in FIGS. 11A to 11C. Firstly, as the non-selection mode, the method to select axis on the image is used. At this point, an interactive input is not executed in the non-selection mode.

In this embodiment, starting from step SP41 and at step SP42, axis is set in the normal line direction of a tangent of the rough boundary area to each pixel in the rough boundary area as shown in FIG. 11A.

Then proceeding to step SP43, and as shown in FIG. 11B, for each pixel in the rough boundary area the edge having the gradient in the direction of set axis is detected and the object boundary is detected.

Then proceeding to step SP44, and as shown in FIG. 11C, the object area is extracted by painting out the object side and the processing is terminated at step SP45.

In this case, since the inside of block is divided into two by an edge point of the object boundary, the object area can be extracted by painting out the object side.

Figure 12:
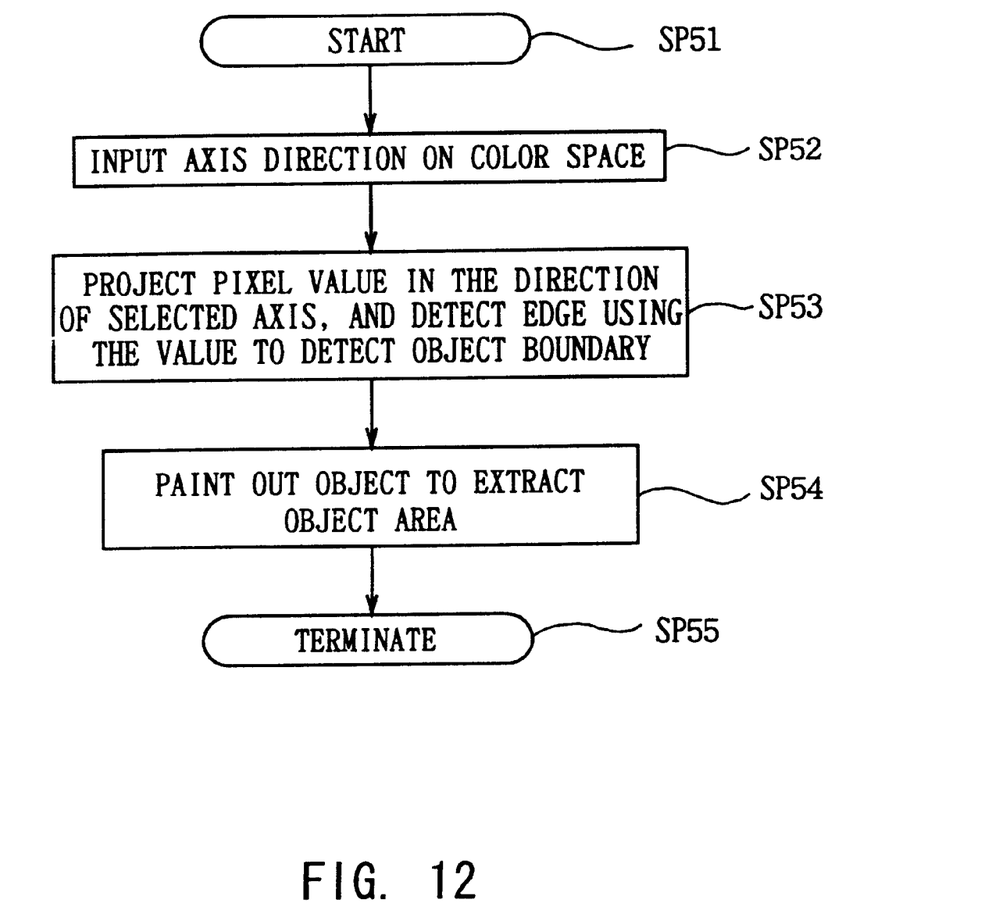
FIG. 12 is a flow chart showing the processing procedure in the case of applying the axis selection on color space to the embodiment as object area extracting means.
Figures 13A, 13B:
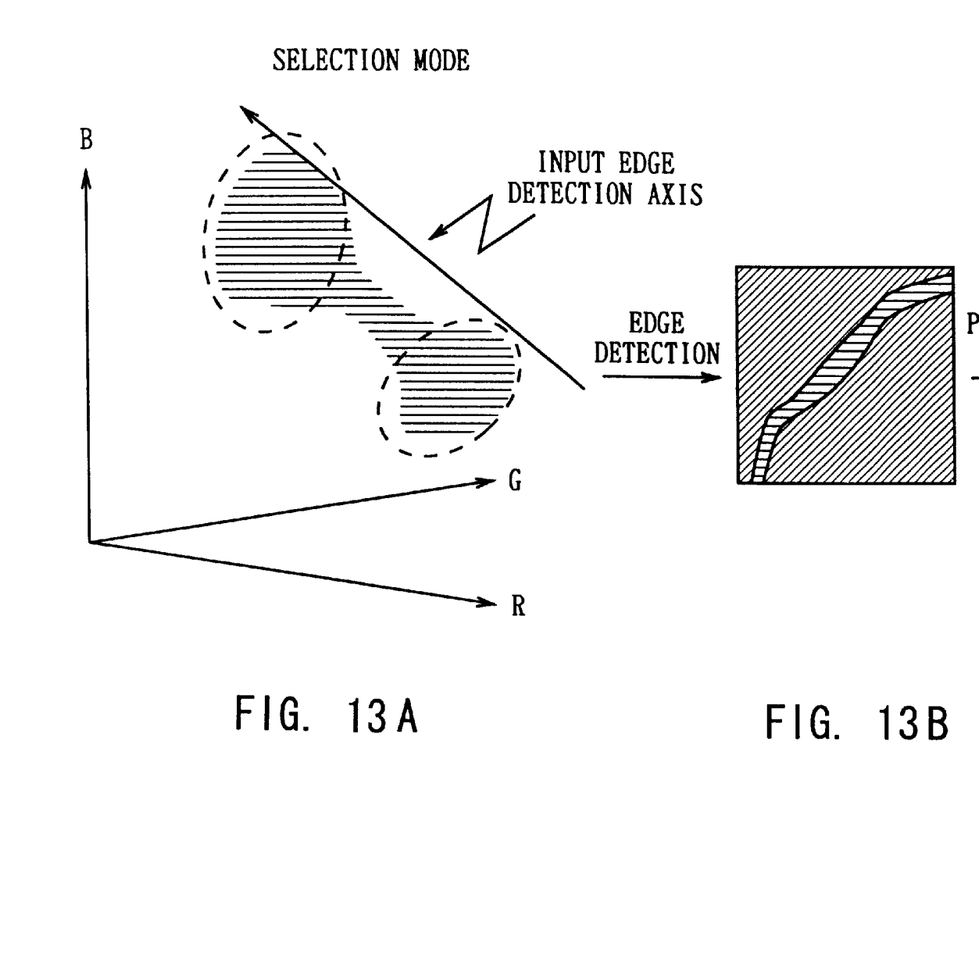
FIGS. 13A–C is a schematic diagram showing the processing flow in the case of using the axis section on color space.
Figure 13C:
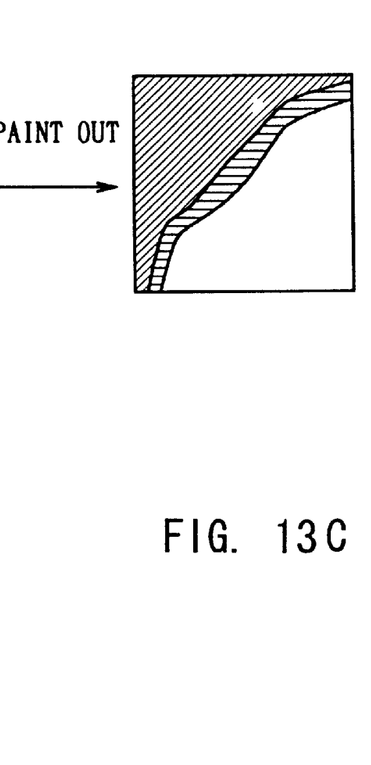

Then, the processing procedure in case of using the method of selecting axis on color space as the selection mode is shown in FIG. 12, and the type figures for facilitating to understand the processing procedure are shown in FIGS. 13A to 13C. Starting from step SP51, and at step SP52, axis direction on color space is input as shown in FIG. 13A. Then, proceeding to step SP53, the pixel value is projected in the direction of selected axis as shown in FIG. 13B, and the edge is detected using this value to detect the object boundary. Then, proceeding to step SP54, the object area is extracted by painting out the object side as shown in FIG. 13C, and at step SP55 the processing is terminated. In this case, since the inside of block is divided into two by the edge point of the object boundary, the object area can be extracted by painting out the object side.

According to the foregoing construction, the area containing the object contour in the image is divided into a plurality of blocks and an object area extracting process is executed in each block respectively by means of the ellipsoid color space dividing method or the axis selection edge detecting method as the object area extracting means, so that the object area can be extracted accurately and efficiently from the image.

Moreover, in the embodiment described above, the ellipsoid color space dividing method and axis selection edge detecting method are used as the object area extracting means. However, the present invention is not only limited to this, but also the other object area extracting means can be used.

According to the present invention as described above, the rough boundary area image in which the boundary area between the desired area and areas other than the desired area is roughly assigned is divided into a plurality of small areas. Then, an area extracting procedure is executed to each small area to detect the desired area and areas other than the desired area from each small area. Succeedingly, a boundary area mask image is formed based on the detected result and the desired area is extracted based on the boundary area mask image. Thus, the desired areas can be extracted from the image accurately and efficiently.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An image area extracting apparatus that extracts a desired area from an image, comprising:

a boundary area dividing unit that divides rough image corresponding to said image, in which boundary area between said desired area and areas other than said desired area is roughly assigned, into a plurality of small areas;

object area extracting means for detecting the desired area and areas other than said desired area from said each small area by executing area extracting means to each of said small areas; and a boundary mask forming unit for forming a boundary area mask image of said roughly assigned boundary area between said desired area and areas other than said desired area depending upon said detection result and extracts said desired area based on said boundary mask image;

a non-boundary mask area mask forming unit that forms a non-boundary area mask image of said areas other than said roughly assigned boundary area;

a synthesizer that synthesizes the boundary area mask image and the non-boundary mask image to form a synthesized mask image for assigning the desired area.

2. An image area extracting method for extracting a desired area from an image, comprising the steps of:

dividing rough boundary area image corresponding to said image, in which boundary area between said desired area and areas other than said desired area is roughly assigned, into a plurality of small areas;

detecting the desired area and areas other than said desired area from said each small area by executing area extracting means to each of said small areas; and forming a boundary area mask image of said roughly assigned boundary area between said desired area and areas other than said desired area depending upon said detection result and extracting said desired area based on said boundary mask image, wherein at least one of said area extracting means of said detecting step is the process of approximating color distribution obtained by distributing color information of designated pixel on color space with an ellipsoid and dividing the image area by dividing said color space using said ellipsoid.

3. An image area extracting apparatus that extracts a desired area from an image, comprising:

a boundary area dividing unit that divides rough image corresponding to said image, in which boundary area between said desired area and areas other than said desired area is roughly assigned, into a plurality of small areas;

object area extracting means for detecting the desired area and areas other than said desired area from said each small area by executing area extracting means to each of said small areas; and a boundary mask forming unit for forming a boundary area mask image of said roughly assigned boundary area between said desired area and areas other than said desired area depending upon said detection result and extracting said desired area based on said boundary mask image, wherein said object area extracting means utilizes an axis selection edge detecting process to extract the image area wherein edges of the desired area are detected by selecting an edge detection axis direction on the image and alternatively by selecting an edge detection axis direction on color space.

4. The image area extracting apparatus according to claim 3, wherein a parameter of one of said each object area extracting means which is executed to said each small area of said detecting step can be adjusted, and the parameter adjusted for each small area is applied.

5. The image area extracting apparatus according to claim 4, wherein at least one of said object area extracting means approximates color distribution obtained by distributing color information of designated pixel on color space with an ellipsoid and dividing the image area by dividing said color space using said ellipsoid.

6. The image area extracting apparatus according to claim 3, wherein as well as there are at least two object area extracting means which are executed to said each small area of said detecting step, the optimum area extracting means is selected for said each small area to execute the selected area extracting means for each small area.

7. The image area extracting apparatus according to claim 6, wherein a parameter of one of said each object area extracting means which is executed to said each small area of said detecting step can be adjusted, and the parameter adjusted for each small area is applied.

8. The image area extracting method according to claim 7, wherein at least one of said object area extracting means approximates color distribution obtained by distributing color information of designated pixel on color space with an ellipsoid and dividing the image area by dividing said color space using said ellipsoid.

* * * * *